(12) United States Patent
Hatfull (10) Patent No.: US 9,587,513 B2
(45) Date of Patent: Mar. 7, 2017

(54) ARRANGEMENT, A SEALING ASSEMBLY, A CASING FLANGE AND A SPACER FOR SEALING THE PROPELLER SHAFT OF A MARINE VESSEL

(75) Inventor: Craig Hatfull, Taupo (NZ)

(73) Assignee: WARTSILA FINLAND OY, Vaasa (FI)

( * ) Notice: Subject to any disclaimer, the term of this patent is extended or adjusted under 35 U.S.C. 154(b) by 567 days.

(21) Appl. No.: 13/877,009

(22) PCT Filed: Sep. 29, 2010

(86) PCT No.: PCT/FI2010/050747
§ 371 (c)(1),
(2), (4) Date: Apr. 9, 2013

(87) PCT Pub. No.: WO2012/042094
PCT Pub. Date: Apr. 5, 2012

(65) Prior Publication Data
US 2013/0189084 A1 Jul. 25, 2013

(51) Int. Cl.
*F03D 11/00* (2006.01)
*F04D 29/08* (2006.01)
*F01D 25/00* (2006.01)
*F16J 15/32* (2016.01)
(Continued)

(52) U.S. Cl.
CPC ........... *F01D 25/00* (2013.01); *B63H 23/321* (2013.01); *F04D 29/106* (2013.01);
(Continued)

(58) Field of Classification Search
CPC .... F01D 25/183; F04D 29/106; F04D 29/108; F04D 29/126; F05D 2240/55;
(Continued)

(56) References Cited

U.S. PATENT DOCUMENTS

| 4,174,672 A | 11/1979 | Cox |
| 4,461,487 A | 7/1984 | Matsumoto |
| 4,483,540 A | 11/1984 | Bordien et al. |

FOREIGN PATENT DOCUMENTS

| GB | 1410454 | 10/1975 |
| GB | 2140880 A | 12/1984 |

(Continued)

OTHER PUBLICATIONS

PCT/ISA/220, PCT/ISA/210, PCT/ISA/237—Notification of Transmittal of The International Search Report and the Written Opinion of the International Searching Authority, dated Dec. 2, 2010, and completed on Nov. 25, 2010, for corresponding PCT International Application No. PCT/FI2010/050747 filed on Sep. 29, 2010.
(Continued)

*Primary Examiner* — Theresa Trieu
(74) *Attorney, Agent, or Firm* — Heslin Rothenberg Farley & Mesiti P.C.; Victor A. Cardona, Esq.

(57) ABSTRACT

A propeller shaft of a marine vessel is supported by bearing means within a stern tube or frame. The stern tube or frame has an aft end provided with a sealing assembly for sealing the propeller shaft. The sealing assembly and the stern tube or frame have at least one leakage monitor line for monitoring the condition of the sealing assembly. The at least one leakage monitor line is provided with a circumferentially extending channel section.

25 Claims, 3 Drawing Sheets

(51) Int. Cl.
*F04D 29/12* (2006.01)
*F04D 29/10* (2006.01)
*F16J 15/02* (2006.01)
*B63H 23/32* (2006.01)

(52) U.S. Cl.
CPC ......... *F04D 29/108* (2013.01); *F04D 29/126* (2013.01); *F16J 15/02* (2013.01); *F16J 15/025* (2013.01); *F16J 15/32* (2013.01); *F16J 15/3204* (2013.01); *F16J 15/3216* (2013.01); *F16J 15/3232* (2013.01); *B63H 2023/327* (2013.01); *F05D 2240/55* (2013.01)

(58) Field of Classification Search
CPC .. B63H 23/321; B63H 2023/327; F16J 15/32; F16J 15/3204; F16J 15/3216; F16J 15/3232; F16J 15/02; F16J 15/021; F16J 15/025
USPC .................................. 415/109, 110–113, 230
See application file for complete search history.

(56) References Cited

FOREIGN PATENT DOCUMENTS

| | | |
|---|---|---|
| JP | 5832099 | 6/1984 |
| JP | 59-145499 A | 8/1984 |
| JP | 63137100 | 9/1988 |
| JP | 07257487 | 10/1995 |
| JP | 2002168280 | 6/2002 |

OTHER PUBLICATIONS

PCT/IPEA/416, PCT/IPEA/409—Notification of Transmittal of the International Preliminary Report on Patentability and International Preliminary Report on Patentability, completed and dated Sep. 14, 2012, for corresponding PCT International Application No. PCT/FI2010/050747 filed on Sep. 29, 2010.
English Translation of Japanese Office Action dated Apr. 30, 2014.
Communication from the European Patent Office dated May 27, 2015, concerning Application No. 10775843.5-1751.

ARRANGEMENT, A SEALING ASSEMBLY, A CASING FLANGE AND A SPACER FOR SEALING THE PROPELLER SHAFT OF A MARINE VESSEL

CROSS-REFERENCE TO RELATED APPLICATIONS

This application is a 371 National Phase of International Application Number PCT/FI2010/050747 filed on Sep. 29, 2010, and published in English on Apr. 5, 2012 as International Publication Number WO 2012/042094 A1, the entire disclosure of which is incorporated herein by reference.

TECHNICAL FIELD

The present invention relates to an arrangement for sealing a propeller shaft of a marine vessel.

The present invention relates also to a sealing assembly for sealing a propeller shaft of a marine vessel.

The present invention relates also to a casing flange for a sealing assembly for sealing a propeller shaft of a marine vessel.

The present invention relates also to a spacer for a sealing assembly for sealing a propeller shaft of a marine vessel.

BACKGROUND ART

The propulsion system of a marine vessel comprises a power source (usually a diesel engine, possibly with an appropriate transmission) that is located inside the engine room within the vessel's hull, and a propeller located at the aft of the vessel outside the hull. The propeller is by a propeller shaft. The propeller shaft is taken inside the hull of the marine vessel by means of a stern tube. The inside of the stern tube is provided with bearing means for carrying the weight of both the propeller shaft and the propeller. The stern tube is fastened to the hull by means of a stern frame. The aft end of the stern tube i.e. the end nearest the propeller, is provided with a sealing assembly the purpose of which is to prevent the sea water from entering the hull of the marine vessel and the bearing lubricating oil from leaking to the sea. However, the sealing members wear or deteriorate over time whereafter they allow either sea water or oil or both pass the sealing. In itself the sealing members do not reveal any problem but, unless any specific measures are taken, the seal failure may only be observed visibly either as oil in the sea or as sea water in the bilge. At first the leakage is most often so minimal that it does not cause any problems in the operation of the sealing or propulsion, but over time the deterioration of the sealing members grow, and the leakage is so voluminous that quick actions are required. Thus it is of utmost importance to detect a leak in the sealing assembly as soon as possible i.e. immediately after its occurrence.

There are a few prior art patent documents, i.e. U.S. Pat. No. 4,174,672, and U.S. Pat. No. 4,483,540 that discuss the above mentioned problem. Both documents teach that the propeller shaft sealing assembly comprises a series of annular seals such that there is one set of seals for the sea water, and one set for the oil. For instance U.S. Pat. No. 4,174,672 teaches that there is one seal ring in the sea water seal set, and two seal rings in the oil seal set. Between these sets of seals there is a void space into which either sea water or oil leaks in case of seal failure. Both prior art patent documents teach how the above mentioned void space is connected by means of a monitor line arranged in connection with the sealing assembly and the stern tube or frame to a specific tank that is continuously monitored. In other words, as soon as leakage occurs the leaked liquid flows along the monitor line into a leakage fluid tank and the leakage is detected well before any real damage occurs. The leakage fluid tank may be monitored, just to name a few alternatives, either by means of a sight glass, or by electrical means monitoring the fluid level in the tank and giving a visible and/or audible warning when a change in the fluid level takes place. In this manner the warning is received in an early stage, and the maintenance of the sealing assembly need not be done immediately, but possibly only during normal maintenance routines.

The monitor line of the leakage fluid is nowadays made to run through several casing rings and a casing flange that form part of the sealing assembly. A part, in practice most, of the casing rings are used for housing annular seals, and a part, normally only the casing flange, for attaching the sealing assembly to the stern tube or frame. The casing rings and the casing flange are attached to each other by means of series of circumferentially arranged bolts. A practical problem exists, as, when designing the stern tubes or frames, the shipyards normally, for a certain stern tube or frame diameter, use a certain number of attaching bolts for fastening the seal assembly to the stern tube or frame, whereby the location of the holes for the bolts is, in a way, standard. However, when positioning the hole, or holes, as there may be several holes, for the leakage fluid monitor line the shipyards seemingly do not apply any standard, but the monitor line is positioned more or less at random. The only rule seems to be, when looking from historical perspective, that the hole/s is/are arranged at a side of the centreline running along a vertical diameter of the stern tube such that the hole/s is/are positioned about 10 to 35 degrees from the centreline.

Now that the sealing assemblies forming the seal between the stern tube or frame and the propeller shaft are often delivered with the propulsion system or by some other supplier the sealing assembly supplier has to make the sealing assembly match to the aft end mounting face of the stern tube or frame. Each, even small change in the angular positioning of the monitor line in the stern tube or frame has resulted in that the seal assembly supplier has to redesign the entire sealing assembly. In practice, if the change in the angular position of the monitor line has been less than 0.5 degrees, the monitor lines in the sealing assembly and in the stern tube or frame have overlapped such that a new design of the sealing assembly has not been needed, but outside the 0.5 degree tolerance design has been a rule. The above described practice results in a huge number of sealing assembly components having slightly differing, dimensions.

An object of the present invention is to provide a propeller shaft sealing arrangement in which at least some problems of the prior art are minimized.

It is also an object of the present invention to provide an arrangement for sealing the propeller shaft of a marine vessel where the positioning of the monitor line for the fluid leaking in case of seal failure has been optimized.

It is a further object of the present invention to provide a sealing assembly, which takes into account possible changes in the angular/circumferential location of the monitor line in the stern tube or frame such that the same sealing assembly components may be used as often as possible irrespective of said changes.

It is a further object of the present invention to provide a casing flange by means of which it is possible to use standard seal casings in spite of changes in the angular/circumferential location of the monitor line in the stern tube or frame such that the same sealing assembly components may be used as often as possible irrespective of said changes.

It is a further object of the present invention to provide a spacer by means of which it is possible to use standard seal casings in spite of changes in the angular/circumferential location of the monitor line in the stern tube or frame such that the same sealing assembly components may be used as often as possible irrespective of said changes.

DISCLOSURE OF THE INVENTION

Objects of the invention are substantially met with an arrangement for sealing a propeller shaft of a marine vessel, the propeller shaft being supported by bearing means within a stern tube or frame, the stern tube or frame having an aft end provided with a sealing assembly for sealing the propeller shaft, the sealing assembly and the stern tube or frame having at least one leakage monitor line for monitoring the condition of the sealing assembly, the at least one leakage monitor line comprising a circumferentially extending channel section.

Objects of the (present invention are also met with a sealing assembly for sealing a propeller shaft of a marine vessel, the sealing assembly comprising a sea water sealing unit and an oil sealing unit, a void space between said units, the sealing assembly having a mounting face for fastening the sealing assembly to a stern tube or frame of a marine vessel, the sealing assembly further having at least one leakage monitor line extending from said void space to said mounting face, the at least one leakage monitor line terminating in at least one circumferentially extending channel section.

Objects of the present invention are also met with a casing flange for a sealing assembly for sealing a propeller shaft of a marine vessel, the casing flange having holes for attaching the sealing assembly to a stern tube or frame and at least one channel section forming part of a leakage fluid monitor line, the casing flange further comprising at least one circumferentially extending channel section in flow communication with said at least one channel section for allowing, when in use, leakage fluid flow from said sealing assembly to said stern tube or frame.

Objects of the present invention are also met with a spacer for installation between a sealing assembly for sealing a propeller shaft of a marine vessel and a stern tube or frame of a marine vessel, the spacer having holes for attaching the sealing assembly to a stern tube or frame, the spacer further comprising at least one circumferentially extending channel section for allowing, when in use, leakage fluid flow from said sealing assembly to said stern tube or frame.

Other characterizing features of the present invention will become apparent from the attached dependent claims.

BRIEF DESCRIPTION OF DRAWINGS

In the following, the present invention will be described by way of a few examples with reference to the accompanying exemplary, schematic drawings, in which.

DETAILED DESCRIPTION OF DRAWINGS

Figure 1:
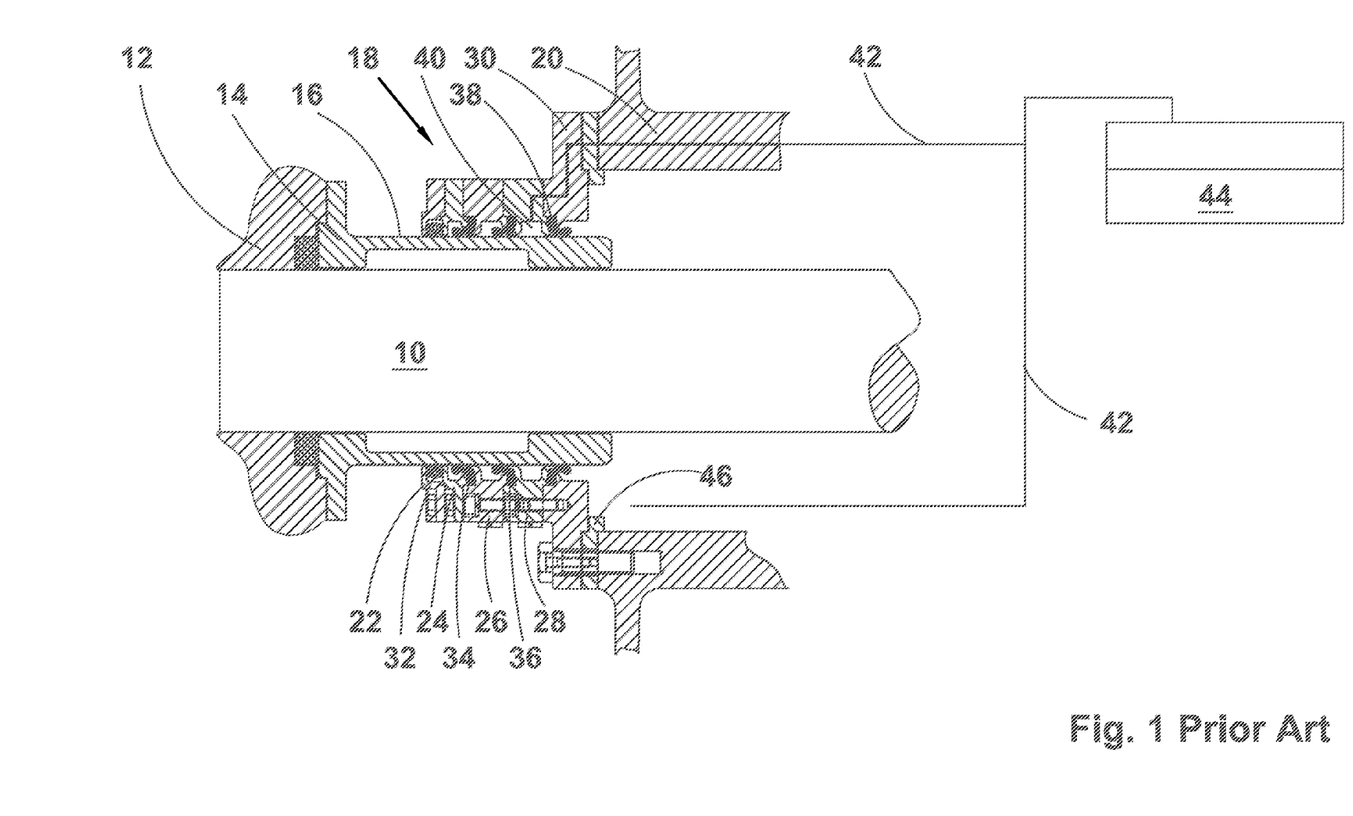
FIG. 1 illustrates an axial cross section of a prior art sealing assembly including the leakage fluid monitoring system.

FIG. 1 illustrates a prior art propeller shaft sealing assembly and a leakage fluid monitoring system arranged in connection with a stern tube. FIG. 1 shows the aft end of the propeller shaft 10 to which the propeller 12 has been fastened. The propeller shaft 10 is surrounded at its rear end by a sleeve 14, which is also bolted to the propeller 12. The outer surface 16 of the sleeve 14 is used as the shaft sealing surface with which the various annular seals of the sealing assembly 18 co-operate. The sealing assembly 18 is fastened to the aft end face of the stern tube 20. The stern tube 20 runs from the hull of the ship to a close proximity of the propeller 12 surrounding the propeller shaft 10 and housing bearing means (not shown) used for supporting the propeller shaft 10. The sealing assembly 18 comprises, in the shown prior art structure, a casing cover 22, first, second and third casing rings, 24, 26, 28, respectively, and a casing flange 30. The casing cover 22, casing rings 24 . . . 28, and the casing flange 30 house four annular seals 32-38. The annular seals 32, 34 and 36 prevent the leakage of sea water into the stern tube 20, and annular seal 38 prevents the leakage of the bearing lubricating oil towards the sea. The first three casing members 22-26, partially also the third casing ring 28, together with annular seals 32, 34 and 36 form the first sealing unit needed for sealing the sea water out of the stern tube, and casing ring 28 (partially) and casing flange 30 together with annular seal 38 the second sealing unit for the sealing of the lubricating oil. Between the two sealing units an annular void space 40 is formed. In this case the void space 40 is formed in the casing ring 28 solely, but it could as well be formed of two adjacent casing rings. The void space 40 is connected by means of at least one monitor line 42 to a monitoring tank 44 for leakage fluid. The monitor line 42, in practice, runs along a channel machined in the casing rings and the casing flange from the void space 40 to the stern tube 20, and along the stern tube 20 forward to the monitoring tank 44, which is normally positioned in the engine room, though also some other appropriate locations may be used. The number of monitor lines 42 varies depending on the shipyard and the stern tube or frame designer, but the number normally ranges between 0 and 4. However, sometimes even 5 monitor lines have been used.

The lower part of FIG. 1 shows how the sealing assembly is put together. As the propeller shaft 10 is supported by means of bearing means to the stern tube 20, it is clear that the propeller shaft 10 is coaxial with the stern tube 20. Thus the sealing assembly 18 is fastened, preferably bolted, to the stern tube 20, preferably to the aft end mounting face thereof as shown in FIG. 1. The construction of the sealing assembly 18 of FIG. 1 shows that the casing flange 30 is used for the fastening. Thus the matching of the sealing assembly 18 to the aft end mounting face of the stern tube 20 is done by means of the casing flange 30. I.e. the dimensions and the design of the casing flange 30 are dictated, on the one hand, by the dimensions of the sealing assembly 18 and the shaft sleeve 14, and on the other hand, by the dimensions of the stern tube and the bolt holes in its aft end mounting face. The matching of the casing flange 30 and the stern tube 20 has been discussed in more detail in connection with the prior art part of the description of FIG. 2.

Further the lower part of the FIG. 1 shows how the casing cover 22 and the casing rings 24 ... 28 are fastened such that they can be removed one after another. In other words, all four casing members 22 ... 28, and annular seals 32 ... 36, cannot be removed as a package but only one casing member and annular seal at a time. Naturally, it is possible that some other prior art sealing assemblies may have somewhat different internal structures, but they have not been discussed here in more detail as the manner the dismantling of a sealing assembly can be done has very little if anything to do with the present problem.

It was already mentioned above that the casing flange 30 has to be designed separately for each stern tube 20, as both the external dimensions of stern tubes, and the circumferential or angular positioning of holes for the bolts used for fastening the sealing assembly 18 at the aft end mounting face of the stern tube 20 change. Thus, the monitor line 42 from the void space 40 to the monitoring tank 44 via the stern tube 20 complicates the construction and design of the sealing assembly 18 remarkably. In other words, each time the angular location of the monitor line in a new stern tube 20 is not substantially (0.5 degree tolerance) the same as before, each casing ring or casing flange housing a channel section for the monitor line i.e. each casing ring between the void space 40 and the stern tube 20 and the casing flange 30 has to be redesigned. The redesigning does not only mean drilling the holes for the monitor lines in new positions, but it may lead to changes in all or almost all casing rings of a sealing assembly. The reason for this kind of changes is the fact that, as the lower part of FIG. 1 shows, there are a high number of holes for fastening bolts arranged along the perimeter of the casing cover, the casing rings and the casing flange. Thus changing the circumferential i.e. angular position of a hole for the monitor line 42 may take the hole too close to a hole for a fastening bolt or the two holes may even open into each other. It is even more so when the actual positioning of the monitor line 42 in the stern tube 20 is taken into account. Normally, the holes for the monitor lines in the aft end mounting face of the stern tube are positioned between 10 ... 30 degrees from the vertical centreline running through the centre of the stern tube 20. Further, the openings are also positioned symmetrical to the above mentioned centreline. Finally this means that, if the circumferential, angular positions of the holes are changed, the holes normally either move towards the vertical line or away therefrom. In other words, the holes either get closer to each other or farther away from each other. This being the case, the positioning of the other casing rings of the sealing assembly to meet the monitor lines in the casing flange 30 cannot be done by just rotating the first mentioned casing rings.

At this stage it is worthwhile mentioning that though the prior art description has this far only talked about the stern tube 20 the member to which the sealing assembly 18 is fastened may also be the stern frame. In such a case, the stern tube is arranged between the stern frame and the hull of the marine vessel. Accordingly, for the above explained reason from now on both the stern tube and the stern frame have been discussed.

Figure 2:
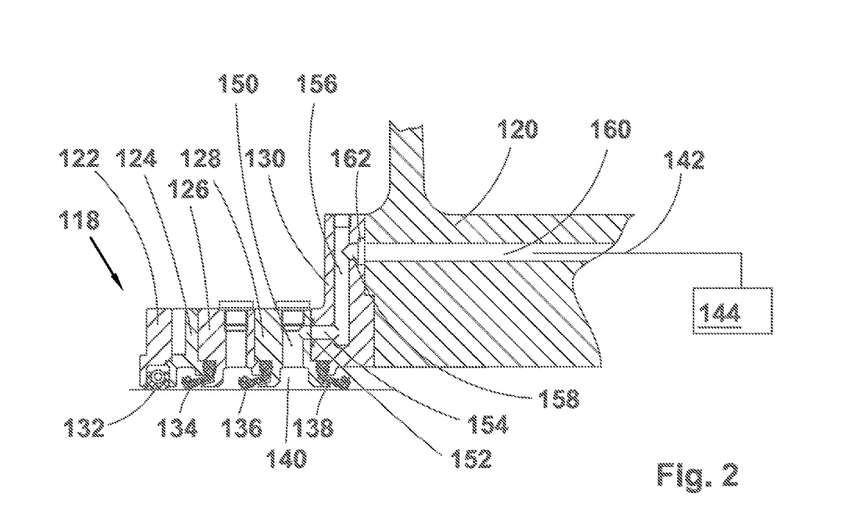
FIG. 2 illustrates an axial cross section of a sealing assembly and the leakage fluid monitoring system in accordance with a first preferred embodiment of the present invention.

FIG. 2 discuses partially a prior art structure, and partially the solution to the above discussed problem in the prior art structure. FIG. 2 uses reference numerals similar to FIG. 1 except the preceding '1'. Thus the seal assembly 118 of FIG. 2 comprises a casing cover 122, a first casing ring 124, a second casing ring 126 and a third casing ring 128, and a casing flange 130, and annular seals 132-138. The three first annular seals 132, 134 and 136 together with cooperating casing cover and rings form the sea water sealing unit, and annular seal 138 together with the third casing ring 128 and the casing flange 130 the oil sealing unit. Naturally the number of annular seals in both units may change, however, only such that in both units there has to be at least one annular seal. The void space 140 for the leakage fluid is located in the third casing ring 128, but it could as well be located between two casing rings. The void space 140 is the starting point of the monitor line 142 leading from the void space 140 to the leakage fluid monitoring tank 144. The monitor line 142 is formed of several channel sections that are preferably made by drilling in various members of the sealing assembly 118 and in the stern tube or frame 120. In fact the channel sections are arranged in all casing rings of the sealing assembly between the void space 140 and the stern tube or frame 120 and in the casing flange 130. Thus the monitor line 142 comprises, in the embodiment shown in FIGS. 2 and 3 a number of channel sections as follows. A first channel section 150 that is preferably a radial drilled hole originating from the void space 140 and extending to the outer circumference of the third casing ring 128. The hole i.e. the first channel section 150 is tapped at the outer periphery of the third casing ring 128. A second channel section 152 is also made in the third casing ring 128 such that it originates from the mounting face of the third casing ring 128 facing the stern tube or frame 120 and opens in the first channel section 150. Preferably the second channel section 152 runs axially and is made by drilling. The casing flange 130 includes the next three channel sections. A third channel section 154 runs from the mounting face of the casing flange 130 facing the third casing ring 128 at a depth in the casing flange 130. Preferably the third channel section 154 is axial, and made by drilling. A vital feature of the third channel section 154 is that it is in both radial and circumferential/angular direction positioned to match the positioning of the second channel section 152 in the third casing ring 128 when the sealing assembly is put together. In other words, the leakage fluid from the void space 140 has to be able to flow up to the third channel section 154 substantially without any obstruction.

A fourth channel section 156 has been provided in casing flange 130 such that it originates from the outer circumference of the casing flange 130 and 2 extends deep into the casing flange 130 such that it opens finally in the third channel section 154. Preferably the fourth channel section 156 is radial, and made by drilling. The fourth channel section 156 is tapped at the outer periphery of the casing flange 130. Naturally, it is also possible to have the fourth channel section originate from the inner circumference of the casing flange 130, too, whereby the inner end of the channel section 156 would be tapped. A fifth channel section 158 extends from the mounting, face of the casing flange 130 facing the stern tube or frame 120 into the casing flange 130 such that it opens in the fourth channel section 156. Preferably the fifth channel section 158 is axial, and made by drilling. Up to this point FIG. 2 discusses the sealing assembly and the monitor line in accordance with prior art. From here on the prior art monitor line would continue in the stern tube or frame 120 such that the sixth channel section 160 in the stern tube or frame 120 would have, to match both the radial and circumferential/angular position of the fifth channel section 158 in the casing flange 130. Or in fact, the entire sealing assembly 118 should be designed such that the positioning of its channel sections 150 ... 158 are dependent on the angular position of the monitor line in the stern tube or frame 120.

Now, in accordance with a first preferred embodiment of the present invention the mounting, face of the casing flange 130 facing the stern tube or frame 120 has been provided with oblong circumferential recess 162 such that the fifth channel section 158 in fact originates from the bottom of the recess 162. By means of the recess 162 a circumferentially extending channel section is provided. Such a channel section makes it possible that the fifth channel section 158 in the casing flange 130 and the sixth channel section 160 in the stern tube or frame 120 need not be exactly similarly positioned. In other words, for ensuring the free flow of leakage liquid ng the monitor line 142 from the void space 140 in the sealing assembly 118 to the sixth channel section 160 in the stern tube or frame 120, it is sufficient that the sixth channel section 160 in the stern tube or frame 120 is in flow communication with the recess or circumferential channel section 162 in the casing flange 130. Thus, the positioning of the sixth channel section 160 may deviate several degrees in the circumferential/angular direction from the positioning of the fifth channel section 158 in the casing flange 130. As shown in FIG. 2, the recess 162 allows also some change in the radial positioning of the sixth channel section 160. The dimensions of the oblong recess depend, on the one hand, in radial direction, on the dimensions of the aft end mounting face of the stern tube or frame 120 and that of the mounting face of the casing flange 130 so that a sufficient sealing can be arranged between the surfaces, and on the other hand, in circumferential direction, on the circumferential distance between adjacent holes for seal assembly fastening bolts. The size of the oblong recess 162 will be discussed in some more in detail in connection with FIG. 4.

Figure 3:
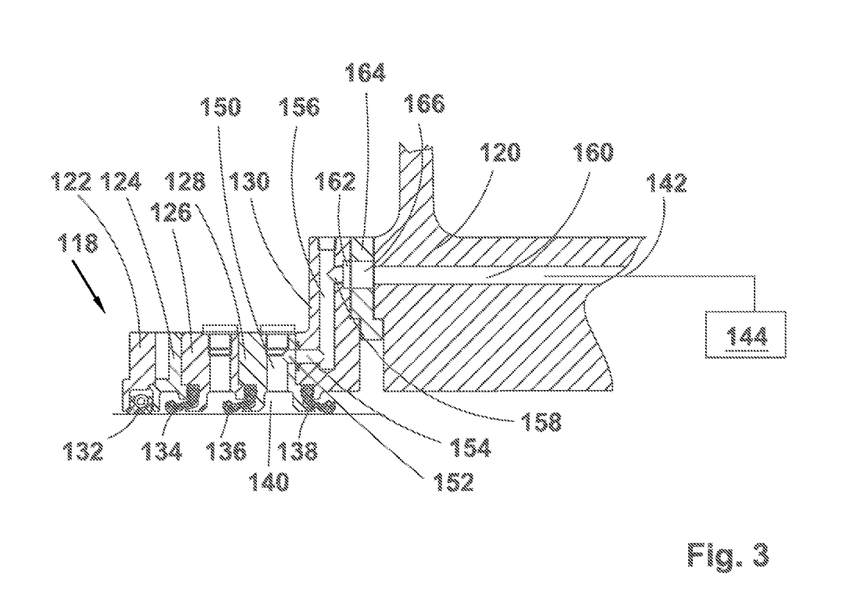
FIG. 3 illustrates an axial cross section of a sealing assembly and the leakage fluid monitoring system in accordance with a second preferred embodiment of the present invention.
Figure 4:
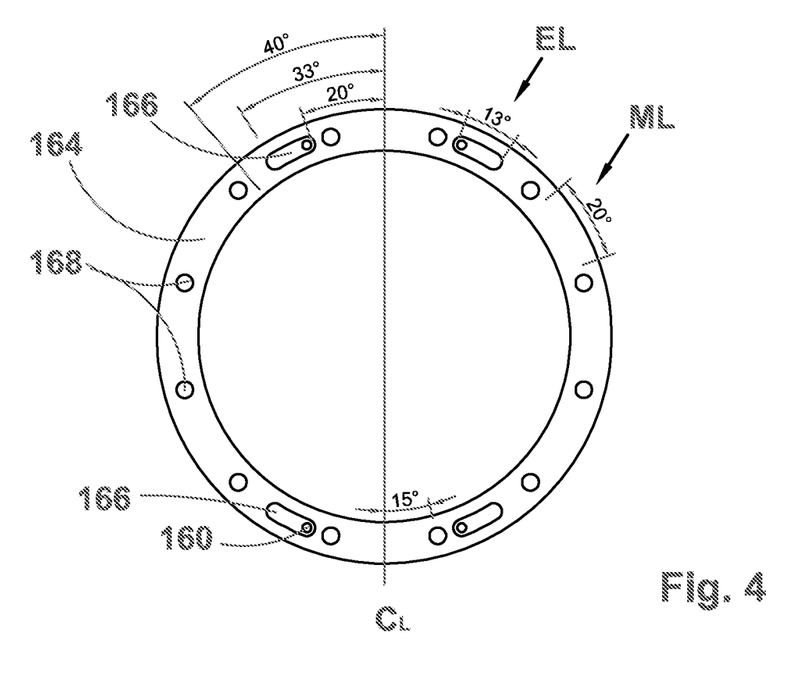
FIG. 4 illustrates a plane view of the intermediate ring or spacer of FIG. 3.

FIGS. 3 and 4 discuss a second preferred embodiment of the present invention. In fact the only difference compared to the structure shown in FIG. 2 can be seen between the casing flange 130 and the stern tube or frame 120, where an intermediate ring or spacer 164 has added. The spacer 164 has been provided with an oblong opening i.e. a circumferentially or angularly extending channel section 166 that corresponds of its function to the oblong recess 162 of the first embodiment of the present invention. As a further embodiment of the present invention the casing flange 130 may have the recess 162 (not necessarily needed, however) when the spacer 164 with its oblong opening 166 has been used. In fact, FIG. 3 shows this further embodiment. And, just to mention a few further embodiments, the spacer 164 need not have oblong opening/s but one or more round openings will do that, however, either originate from or terminate to (or both) an oblong recess in its mounting face/s corresponding to that in casing flange 130 in FIGS. 2 and 3. Further. FIG. 4 shows, for clarification of the invention, by reference numeral 160 the sixth channel section located in the stern tube or frame 120 so that it is easy to imagine how much the position of the sixth channel section in the stern tube or frame may be changed until the spacer, and other components of the sealing assembly 118 need to be redesigned and changed.

The embodiment of the present invention discussed in FIG. 4 shows that the spacer 164 has 12 holes 168 for the fastening bolts, whereby the holes 168 are angularly 30 degrees apart and leave an applicable land area of about 20 degrees in between, when the required width of the sealing surface in connection with the holes 168 has been taken into account. Thus, maximal length ML of an oblong opening or the circumferential channel section is about 20 degrees.

However, the spacer structure shown in FIG. 4 has four oblong openings 166 located symmetrical to the vertical diameter or centreline CL of the spacer 164 and having an effective angular, extension EL of about 13 degrees. Thus the angular position of the monitor line/sixth channel section 160 may range, in this illustrated embodiment, between about 20 to about 33 degrees from the vertical centreline CL of the spacer (and that of the stern tube or frame) until the structure of the spacer 164 need to be changed. However, as already mentioned the oblong opening 166 is not in FIG. 4 as long or extensive in circumferential/angular direction as it could be. Thus, if the monitor line has been taken farther away from the centreline CL the oblong opening could be extended to about 40 degrees from the vertical centreline CL. In other words, the total circumferential/angular extension of the oblong opening 166, or that of the recess 162 discussed earlier in connection with FIG. 2, is from about 20 degrees to about 40 degrees.

Yet, it has to be understood that the above dimensions apply only in such a case that the sealing assembly has been fastened to the stern tube or frame by means of 12 bolts, where not a single bolt is located on the vertical centreline, and where the bolts are positioned with equal angular spacing and symmetrical to the vertical centreline. If, for instance, the twelve bolts have been located such that a pair of bolts is located on the vertical centreline the above discussed total circumferential or angular extension of the oblong opening or recess is between about 5 degrees and about 25 degrees, if the oblong opening or recess is arranged in the land area between the holes for fastening bolts closest to the vertical centreline. If the oblong opening is located in the next land area somewhat farther away from the centreline, the angular extension is between about 35 to about 55 degrees. Naturally, also the number of fastening bolts may change. It is obvious that with smaller diameters less than twelve fastening bolts suffice, and with larger diameters more than twelve bolts are needed. Thus the actual angular extension of the oblong recesses or openings depends totally on the number of bolt holes, and their positioning in the spacer or in the casing flange.

Yet another additional embodiment of the invention has already been very briefly referred to above. I.e. it was mentioned that the recess 162 in FIG. 2 extends slightly also in radial direction. Naturally the same applies to the spacer version of the invention (FIGS. 3 and 4), too. However when looking at FIGS. 2 and 3 it is easy to see that the oblong recess or opening could in view of the sealing needs, extend much farther in radial direction (towards the axis) than shown. In other words, in case the monitor line channel section 160 in the stern tube or frame 120 is not located on the same radius with the sealing assembly fastening bolts, extending the recess to form not only a circumferential channel section but a channel section that extends simultaneously in both circumferential and radial direction. Such an inclined channel section makes it possible to catch openings of the sixth channel sections 160 from a wider area than the earlier discussed embodiments.

Studies have revealed that the present invention, by using the oblong openings or recesses i.e. the circumferentially/ angularly extending channel sections, is able to cover more than 80 percent of the stern tubes or frames presently in use. Thus the need for designing and manufacturing separate parts has been reduced to minimum, which not only reduces work in the design, but also reduces part numbers, drawings and all related matters.

A further way of simplifying the construction of the monitor line between the void space in the sealing assembly and the monitoring tank is to arrange the circumferentially extending channel section in the aft end mounting face of the stern tube or frame.

While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The details mentioned in connection with any embodiment above may be used in connection with another embodiment when such combination is technically feasible.

The invention claimed is:

1. Arrangement for sealing a propeller shaft of a marine vessel, comprising:
    a propeller shaft being supported by bearing means within a stern tube or frame, the stern tube or frame having an aft end with an aft end mounting face, to which a sealing assembly for sealing the propeller shaft is fastened, and
    a sealing assembly having a sealing assembly mounting face facing the stern tube or frame, the sealing assembly and the stern tube or frame having at least one leakage monitor line for monitoring the condition of the sealing assembly, and;
    wherein at least one of the aft end mounting face or the sealing assembly mounting face comprises a circumferentially extending oblong channel section, the circumferentially extending oblong channel section being in flow communication with the at least one leakage monitor line.

2. The arrangement as recited in claim 1, wherein the sealing assembly has a casing flange via which the sealing assembly is fastened to the stern tube or frame, the casing flange has a mounting face facing the stern tube or frame, and the circumferentially extending oblong channel section is an oblong recess provided in the mounting face of the casing flange.

3. The arrangement as recited in claim 2, wherein at least one of the casing flange or the spacer has a vertical centerline CL, the sealing assembly comprises at least two circumferentially extending oblong channel sections, and the oblong channel sections are arranged symmetrical to the centerline CL.

4. The arrangement as recited in claim 1, wherein the sealing assembly has a casing flange via which the sealing assembly is fastened to the stern tube or frame, an intermediate ring or spacer is arranged between the casing flange and the stern tube or frame, and the circumferentially extending oblong channel section is provided in said intermediate ring or spacer, the circumferentially extending oblong channel section being either an oblong recess provided in one or both of the spacer mounting faces or an oblong opening in said spacer.

5. The arrangement as recited in claim 4, wherein the sealing assembly mounting face, the aft end mounting face and the intermediate ring or spacer are provided with holes for fastening the sealing assembly to the stern tube or frame, the sealing assembly mounting face, the aft end mounting face and the intermediate ring or spacer having land areas between adjacent holes, the land areas having a circumferential length, the circumferentially extending oblong channel section having a maximal length depending on the circumferential length of the land areas.

6. The arrangement as recited in claim 1, wherein the circumferentially extending oblong channel section extends also in a radial direction.

7. The arrangement as recited in claim 1, wherein the sealing assembly mounting face and the aft end mounting face are provided with holes for fastening the sealing assembly to the stern tube or frame, the sealing assembly mounting face and the aft end mounting face having land areas between adjacent holes, the land areas having a circumferential length, the circumferentially extending oblong channel section having a maximal length depending on the circumferential length of the land areas.

8. The spacer as recited in claim 7, wherein the spacer has land areas between the holes, the land areas having a circumferential length, the circumferentially extending oblong channel section having a maximal length depending on the circumferential length of the land areas.

9. The spacer as recited in claim 7, wherein the at least one circumferentially extending oblong channel section has a maximal length of 20 degrees.

10. A sealing assembly for sealing a propeller shaft of a marine vessel, the sealing assembly comprising:
    a sea water sealing unit and an oil sealing unit, a void space between said units,
    a mounting face for fastening the sealing assembly to a stern tube or frame of a marine vessel,
    at least one leakage monitor line extending from said void space to said mounting face, and
    wherein the at least one leakage monitor line terminates in at least one circumferentially extending oblong channel section provided in said mounting face.

11. The sealing assembly as recited in claim 10, wherein the sealing assembly has a casing flange, the mounting face being a part of the casing flange.

12. The arrangement as recited in claim 11, wherein the maximal length of the at least one circumferentially extending oblong channel section is 20 degrees.

13. The sealing assembly as recited in claim 11, wherein at least one of the casing flange or the spacer have holes for the fastening bolts and land areas between the holes, and the at least one circumferentially extending oblong channel section is positioned in said land area.

14. The sealing assembly as recited in claim 13, wherein the land areas have a circumferential length, the circumferentially extending oblong channel section having a maximal length depending on the circumferential length of the land areas.

15. The arrangement as recited in claim 14, wherein the maximal length of the at least one circumferentially extending oblong channel section is 20 degrees.

16. The sealing assembly as recited in claim 10, wherein the sealing assembly has a casing flange and a spacer attached to said casing flange, the mounting face being a part of the spacer.

17. The sealing assembly as recited in claim 16, wherein the at least one circumferentially extending oblong channel section is an oblong opening in said spacer.

18. The arrangement as recited in claim 16, wherein the maximal length of the at least one circumferentially extending oblong channel section is 20 degrees.

19. The sealing assembly as recited in claim 10, wherein the at least one circumferentially extending oblong channel section is an oblong recess in said mounting face.

20. The sealing assembly as recited in claim 10, wherein the sealing assembly has a vertical centerline CL, that the sealing assembly comprises at least two circumferentially extending channel sections, and the channel sections are arranged symmetrical to the centerline CL.

21. The sealing assembly as recited in claim 10, wherein the circumferentially extending oblong channel section extends also in radial direction.

22. A casing flange for a sealing assembly for sealing a propeller shaft of a marine vessel, the casing flange comprising:
- holes for attaching the sealing assembly to a stern tube or frame,
- a mounting face facing, when in use, the stern tube or frame,
- at least one oblong channel section forming part of a leakage fluid monitor line, and
- wherein the casing flange further comprises in its mounting face at least one circumferentially extending oblong channel section in flow communication with said at least one channel section for allowing, when in use, leakage fluid flow from said sealing assembly to said stern tube or frame.

23. The casing flange as recited in claim 22, wherein the casing flange has land areas between the holes, the land areas having a circumferential length, the circumferentially extending oblong channel section having a maximal length depending on the circumferential length of the land areas.

24. The casing flange as recited in claim 23 wherein the maximal length of the at least one circumferentially extending oblong channel section is 20 degrees.

25. A spacer for installation between a sealing assembly for sealing a propeller shaft of a marine vessel and a stern tube or frame of a marine vessel, the spacer having holes for attaching the sealing assembly to a stern tube or frame, wherein the spacer further comprises at least one circumferentially extending oblong channel section for allowing, when in use, leakage fluid flow from said sealing assembly to said stern tube or frame.

* * * * *